Jan. 13, 1953          C. A. WOFFORD          2,625,226
                      SUBSURFACE SAMPLER
Filed Dec. 12, 1947                          2 SHEETS—SHEET 1
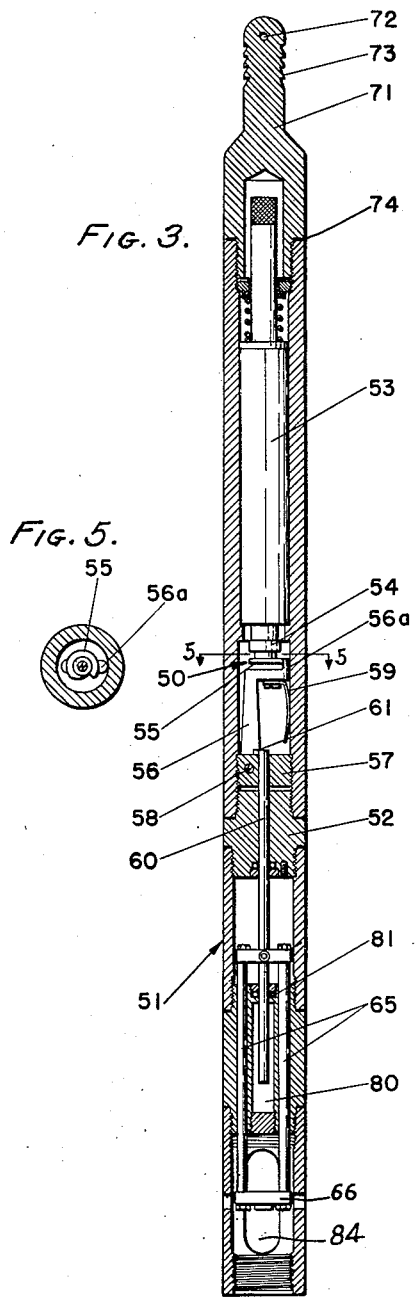
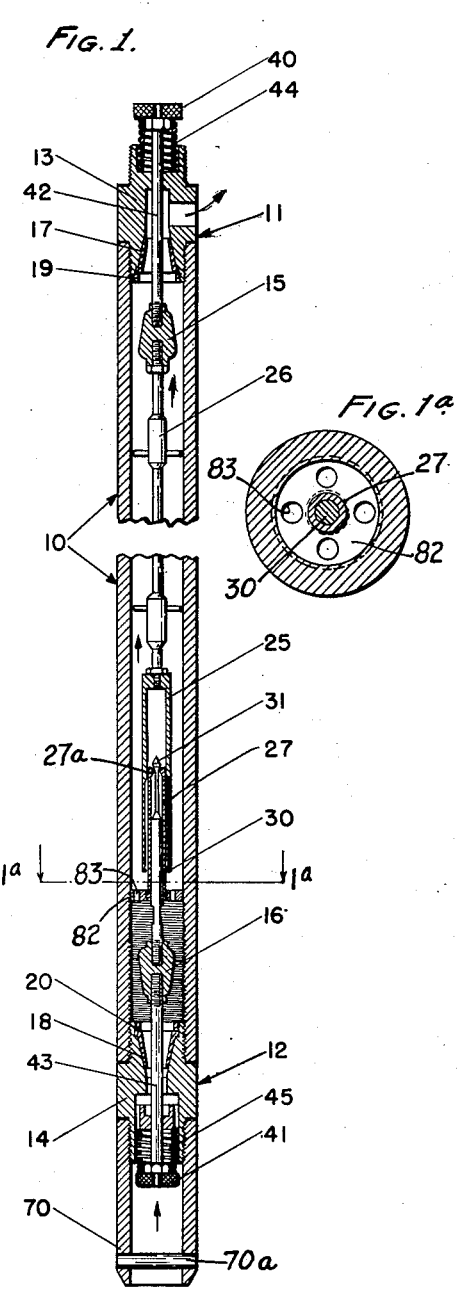
INVENTOR.
BY Custer A. Wofford
Stevens, Davis and Miller
ATTORNEYS

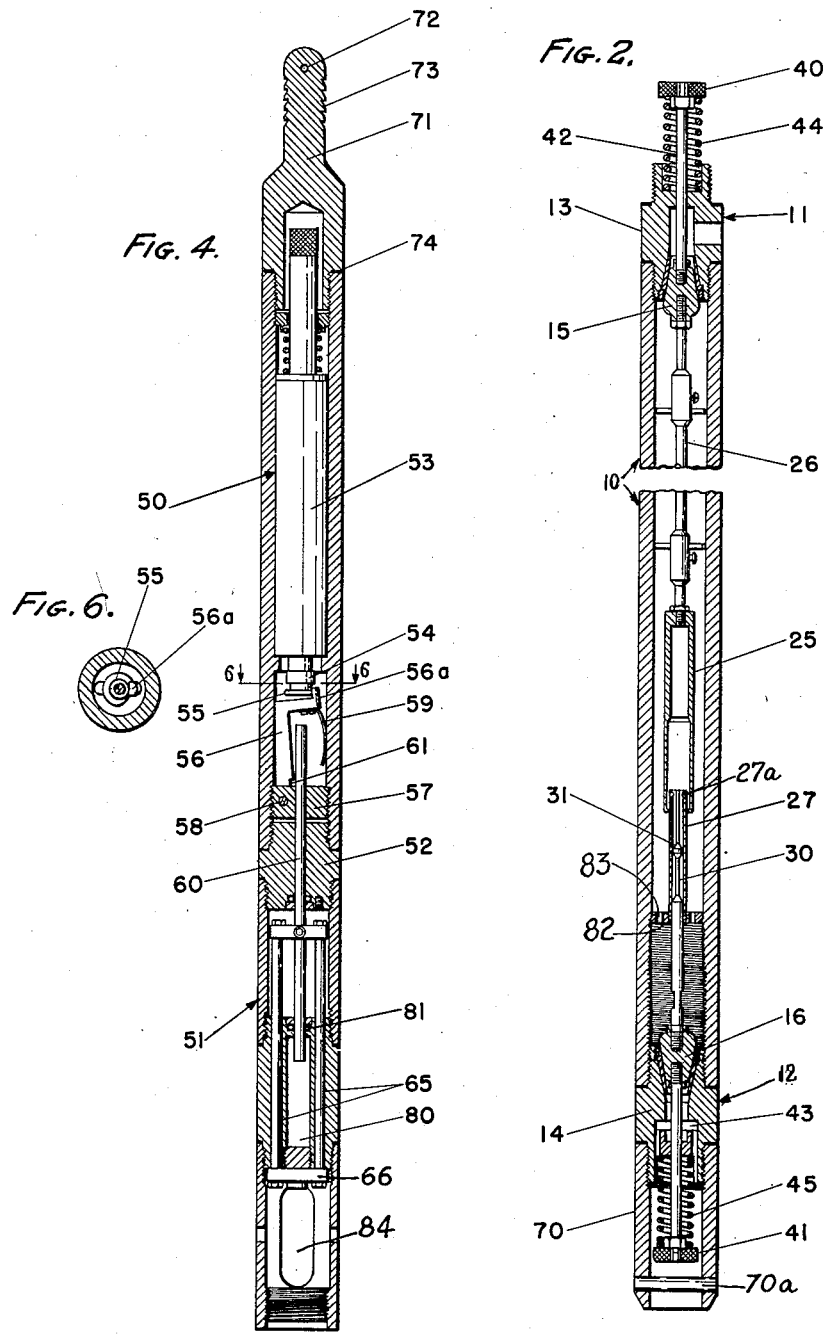

Patented Jan. 13, 1953

2,625,226

UNITED STATES PATENT OFFICE 2,625,226

SUBSURFACE SAMPLER

Custer A. Wofford, Tulsa, Okla., assignor to Engineering Laboratories, Inc., Tulsa, Okla., a corporation of Delaware Application December 12, 1947, Serial No. 791,281

1 Claim. (Cl. 166—19)

This invention relates to a device for obtaining fluid samples and more particularly to a device for obtaining fluid samples from well bores.

In recent years, the petroleum industry has come to a full realization of the importance of obtaining accurate data regarding hydrocarbon-bearing reservoirs. The determination, interpretation, and application of this data is commonly known by the broad term, reservoir engineering. Among the data pertinent to reservoir engineering, are drilling logs, formation sample logs, core records, electrical survey logs, and reservoir fluid characteristics. With these and other data, the reservoir engineers can predict the future recovery of hydrocarbon fluids and determine what methods of production will recover the maximum quantity of hydrocarbon fluid from the reservoir.

In the data enumerated above, the reservoir fluid characteristics are especially useful in predicting the behavior of the fluid in a hydrocarbon bearing reservoir, during the productive life of the reservoir. It is to be noted that hydrocarbon oil and gas produced at the surface of the ground has an entirely different set of physical characteristics at normal atmospheric pressure and temperature than the same oil and gas has in the reservoir at superatmospheric pressure and temperature. Hence, it is very desirable to obtain fluid samples which are truly representative of reservoir conditions.

While it has been heretofore possible to obtain bottom hole samples of hydrocarbon fluids and to transfer such samples from the sampler to the laboratory for subsequent study, considerable difficulty has been experienced in obtaining a truly representative reservoir sample of hydrocarbon fluid. The devices which are now available to the industry for obtaining bottom hole samples have various faults of design and construction which permit the escape of gas or liquid from the sampler and render the sample of fluid which is ultimately examined non-representative of the reservoir.

It is an object of my invention to provide a sampler so designed as to prevent the escape of gas or liquid therefrom. The sampler of my invention is positive in action and simple in operation requiring the use of a tubular designed clock which actuates a lever releasing the valves and allowing them to close at a predetermined time.

My invention has for its primary utility obtaining fluid samples and more particularly for obtaining such samples from well bores.

Another object of my invention is the provision of a sampling device for obtaining representative subsurface or bottom hole samples of hydrocarbon fluids.

Other objects and advantages of my invention will be apparent upon consideration of the following detailed description of the structure and operation of a preferred embodiment thereof in conjunction with the annexed drawings wherein:

Figure 1 is a view in vertical section of a sampler constructed in accordance with the teachings of the present invention, the valves being shown in open position;

Figure 1a is a view taken along the line 1a—1a in Figure 1;

Figure 2 is a view similar to that of Figure 1 but illustrating the closed position of the sampler valves;

Figure 3 is a view in vertical section of the open valve position of the valve operator of the present invention, the assembly of Figure 3 being, in use, threaded to that of Figures 1 and 2 and lying thereabove;

Figure 4 is a view similar to that of Figure 3 but showing the closed valve position of the valve operator;

Figure 5 is a view in section taken along the line 5—5 of Figure 3; and

Figure 6 is a view in section taken along the line 6—6 of Figure 4.

Referring now more particularly to Figures 1 and 2 of the drawings there is shown an elongated tubular reservoir chamber 10, having outside dimensions of approximately 1½" and adapted to contain approximately 650 cc. of fluid. The reservoir chamber 10 is provided at its upper portion with a valve mechanism 11, and in its lower portion with a valve mechanism 12, both of which are threaded into its wall. Valve mechanisms 11 and 12 contain valve seats 13 and 14 respectively which are frustro-conical in shape and which are in coacting relationship with valves 15 and 16 respectively.

The valve seats 13 and 14 are provided with inserts 17 and 18 respectively which are made of any resilient and readily distortable material such as one of the synthetic rubber compounds. This particular type of insert will provide a highly effective seal. Threaded gasket retainers 19 and 20 hold inserts 17 and 18 in place and prevent leakage of fluid between the inserts and valve body assemblies 11 and 12.

Two different settings of the valve mechanisms 11 and 12 are separately shown in Fig. 1 and Fig. 2. In Fig. 1, the valves 15 and 16 are open thereby allowing the fluid in the drill hole to enter the chamber 10 through the annular opening in the lower valve seat 14 and to leave the chamber through the opening provided in the upper valve seat 13, thereby insuring thorough flushing as the assembly is lowered through the liquid to be sampled. The motion of the fluid through the chamber is indicated by means of arrows. Fig. 2 shows on the other hand, the valves 15 and 16 in a closed position in which they trap any fluids previously introduced into the chamber.

For the operation of the device, means are provided to hold the valves in an open position as shown in Fig. 1, once they are opened, and to hold the valves in a closed position as shown in Fig. 2, once they are closed.

In order to maintain the valves in an open position once they are open, a suitable interlocking mechanism is placed within the chamber 10. The interlocking mechanism comprises two elongated tubular members. One of these known as interlock sleeve 25, is fixedly connected to the upper valve 15 by means of a rod 26 and moves upwards or downwards with the valve 15. Fig. 1 shows the interlock sleeve in the downward position and Fig. 2 shows it in its upward position. The other tubular member in the interlocking mechanism is known as interlock body 27 and is threaded to the lower portion of the chamber 10.

The interlock body 27 is comprised of a three (3) pronged tubular member 27a that is internally upset on its upper end. The bottom part of interlock body 27 is merely a tubular member that is threadedly connected at its lower end to a nut 82 which in turn is threadedly connected to the inside of the sampler chamber 10. The nut 82 is provided with a plurality of circumferentially spaced outlets 83 for the passage therethrough of the sample fluid into the chamber 10. It is apparent that the interlock body 27 is stationary, i. e. it does not participate in the valve motion.

The interlock mechanism comprises also a third element known as interlock pin 30, which is threadedly connected to the lower valve 16 and is provided with an enlarged end 31. The interlock pin is contained within the interlock body and is adapted to move upwards or downwards with the motion of valve 16. Two representative positions of the interlock pin are shown in the drawings. Namely, Fig. 1, illustrates the position when the valves are open, and in this position the enlarged end 31 of the interlock pin protrudes through the interlock body 27. When the valves are closed as shown in Fig. 2 the enlarged end is maintained in this interlock body 27.

The interlock sleeve 25 has a larger diameter than the interlock body 27 and, therefore, is adapted to be shoved down upon the interlock body 27 simultaneously with the opening of the valves as shown in Fig. 1. The lower portion of the interlock sleeve has a larger internal diameter than the upper portion, so that when the upper valve is opened the interlock sleeve 25 is forced down over the interlock body 27 and, by reason of the smaller diameter of the upper portion of the sleeve, compresses the tubular pronged interlocking body 27, thus holding enlarged portion 31 of the interlock pin against downward movement. Therefore, as long as the upper valve is open the lower valve is held open.

In order to maintain the valves in closed position, a suitable spring mechanism is arranged to cooperate with the valve system. Two nuts 40 and 41 are provided at suitable distances above the upper valve 15 and below the lower valve 16 respectively. These nuts are made fast to the valve by rods 42 and 43 respectively, and serve as seats for one end of compression springs 44 and 45. These compression springs have their other ends pressing against the valve bodies 11 and 12 respectively, thereby maintaining the valves 15 and 16 normally in a closed position as shown in Fig. 2.

From the above description it can be seen and readily understood that when the lower valve is opened the interlock pin 30, with the enlarged end 31, is thus forced upward until the enlargement protrudes above the interlock body 27. Then by opening the upper valve assembly the interlock sleeve 25 is forced down and over the interlock body 27 and as long as the upper valve is held open the lower valve will also remain open. When the upper valve is allowed to close, through action of the valve spring 44, the interlock sleeve 25 will automatically rise and allow the interlock pin 31 to slip down through the interlock body 27, and the lower valve spring 45 will thus seat the lower valve.

In order to open and close the valves at determined instants a suitable energizing means is provided. This means is designated as clock tripping system 50 and is arranged to transmit downwardly upon the nut 40 a force compressing the spring 44 and thereby opening the upper valve, see Figs. 3 to 6 inclusive. This force is transmitted by means of a suitable mechanical linkage positioned within the housing 51. Between the clock tripping mechanism and the housing 51 is interposed a stuffing box 52, said stuffing box being threadedly connected to the lower portion of the tripping mechanism and to the upper portion of the housing.

The clock tripping mechanism comprises a clock 53, which is of standard tubular construction. The clock is fixedly mounted by any suitable means such as a key to the outer casing of the clock tripping system 50. Within the clock 53 and adapted to rotate therein is a shaft 54 coaxially aligned with the clock 53. The shaft 54 is mounted within the clock 53 by any suitable means obvious to one skilled in the art. To the lower portion of the shaft 54 is attached a cam 55 adapted to rotate with the shaft at a uniform angular speed. Below the cam is positioned a trigger 56 which is fastened to a trigger anchor 57 by means of a suitable hinged pin 58. A trigger spring 59 is provided which tends to force the trigger to one side of the clock tripping chamber. This force is, however, counterbalanced by the pressure of the cam which is in slidable contact with the upper portion 56a, of the trigger 56. Two relative positions of the cam 55 and trigger element 56a are illustrated in Figures 5 and 6. In Figure 5 the cam pushes the trigger element 56a to the side of the chamber against the action of the spring 59, thereby holding the trigger 56 in a vertical position as shown in Figure 3. However, during the rotation of the shaft 54 the cam comes to a position shown in Figure 6, at which it yields to the spring 56 and causes the trigger to assume an inclined position as shown in Figure 4.

It is therefore apparent that the trigger 56 may occupy two different positions, i. e., vertical position illustrated in Figure 3, and inclined position illustrated in Figure 4. Below the trigger 56 is placed a control rod 60 that protrudes downwardly through the stuffing box 52 into the linkage system 51. When the cam is in vertical position as shown in Figure 3, the upper portion of the control rod 60 is held in place. However, during the rotation of the clock, an instant is reached when the spring 59 causes the trigger to move to the inclined position shown in Figure 4, thereby releasing an appropriate spring mechanism causing the control rod to move upwards as shown in Figure 4.

In operation the internally threaded lower end of the assembly 50 is threaded over the externally threaded boss of the valve seat 13. The control rod 60 is then actuated by the spring 44 acting through the nut 40, the connected ends of crosshead rods 65 and crosshead 66 establishing the connection. It is not necessary that the nut 40 be connected to the ends of the crosshead rods 65 so long as bearing engagement is possible. The two parallel crosshead rods 65 and the crosshead 66 are open to well pressures so that forces due to well pressures by means of being balanced have no effect on the rod 60. The upper end of the rod 60 is under atmospheric pressure only because it is within the clock housing 50 and so protected from well pressure by reason of stuffing box 52. The lower end of rod 60 is also under atmospheric conditions, being contained in a pressure-balancing chamber 80 which is protected from well pressure by stuffing box 81. Therefore, the only force that can actuate rod 60 is the force of spring 44 tending to close upper valve 15 by reason of pushing up against nut 40, nut 40 in turn, attempting to force the two parallel crosshead rods 65 upward which are connected to rod 60 by means of crosshead 66.

All the structural elements described hereinabove and constituting the present device, are mounted in the form of a single elongated unit adapted to be lowered into a bore hole. The lower portion of this unit is protected by a nose cap 70, having a guard pin 70a, which is threadedly engaged into the lower valve body 12. The upper portion of the unit consists of a tail plug 71 provided with an opening 72 for receiving a wire line by which the device is lowered into or withdrawn from a well hole. Suitable notches 73 are provided on the external periphery of the tail plug to facilitate recovery of the device in the event that it becomes lost or stuck in the well bore. The tail plug is threadedly connected to the upper portion of the clock housing 50. The joint between the clock housing 50 and tail plug 71 is sealed with a gasket 74.

In order to understand the operation of my invention let us assume that the device has been assembled and the relative position of the various parts are as shown in Figure 2 with valves closed. In order to obtain a fluid sample, valve 16 must first be opened and held open. This is accomplished by removal of the nose cap 70, having a safety bar 70a therein, placing the sampler on the ground or some stationary object in a vertical position. The weight of the sampler assembly will open the lower valve 16, and will cause the interlock pin 30 to move upwards until enlarged end of pin 31 is above the top of interlock body 27. The control rod 60 is then pushed down by use of a small pronged tool hooked on top of piston cross head 66 and inserted through opening 84, forcing the upper valve nut 40 downwards and thereby opening the upper valve 15. Simultaneously with the opening of the valve 15, the interlock sleeve 25 is forced down over the interlock body 27 thereby holding the interlock pin 31 in a locked position as explained hereinabove.

With the valves held thus in an open position, clock head tail plug 71 is removed, clock 53 is inserted and turned to the right, or clockwise until the notch of cam 55 presses against trigger element 56a as shown in Figure 3. The clock is then rotated by hand in the reverse direction at least ¼ of a turn, or to the desired time of setting so as to hold trigger 56 vertically and onto the outer circle of the cam. A suitable wire line is then threaded through a stuffing box located in the hoisting apparatus and attached to tail plug 71 which is then fastened to the top of the clock tripping mechanism housing. The tool which is helding piston crosshead 66 down, is then removed. The cam is then holding trigger 56 vertically which in turn is holding crosshead shaft 66 down, thereby holding upper valve 15 open.

As long as the upper valve is held open the interlock assembly is holding the lower valve open. The nose cap 70 is then fastened to lower valve body 12 to protect lower spring 45. The device is ready to be run into the well.

While lowering the sampler, the well fluids contained within the well enter through the bottom valve which is held open and out through the top valve assuring positive flushing. When predetermined depth is reached the instrument is allowed to set at this depth until a predetermined time has elapsed. When this time has elapsed, the clock will have turned the cam sufficiently to allow the notched portion of the cam to be placed in such a position that the trigger 56 will fall into the notch and against the side of the clock head body, due to the force exerted by spring 59, and will cause an upward thrust of the control rod 60 under the action of spring 44. Consequently, the upper valve 15 closes, raising interlock sleeve 25. This allows the interlock pin 31 to slip down through interlock body 27 and causes the lower valve 16 to close under the effect of forces actuated by lower spring 45. Thus a sample of fluid contained in chamber 10 is sealed.

It will be noted that compression springs 44 and 45 are of such strength as to hold valves 15 and 16 firmly enough on their seats to prevent leakage of fluid from chamber 10. As valve inserts are resilient and distortable, any solid materials entrained in the well fluid will be depressed into the valve insert by the force of the springs completely sealing the valves. This positive action is highly desirable for obtaining fluid samples from both low and high pressure formations, the spring holding the valves closed when low pressures are encountered and the pressure of the fluid in the chamber forcing the valves tighter on their seats as the device is withdrawn from the well bore and the pressure on the outside of the device decreases. The clock head is positive in its action in holding the valves open, and allowing it to close at a predetermined time is desirable because when taking well samples with a device that depends on the destruction or shearing of some member, it is never known for certain whether this member was destroyed or sheared during descent of the instrument into the bore hole, or when pulled from the bored hole, or if it was sheared or broken at the point desired.

It is to be understood that the form of this invention herewith shown and described is to be taken as a preferred assembly of the same and that various changes in sizes, shape and arrangement of parts may be resorted to without departing from the spirit of this invention as defined by the appended claim.

I claim:

In a sampling device for receiving well fluid samples of the type that includes a casing, a valve at each end of said casing, and means resiliently biasing the said valves to closed position, the improvement that comprises a hollow interlocking body mounted at one end to said casing, at least a portion of the other end of said body comprising a plurality of pronged, tubular members, said members being internally upset at their upper end, an interlocking pin attached at one end to one of said valves for slidable movement on the inner surface of said body, said pin having on its other end an enlarged head, a sleeve attached at one end to the other of said valves for slidable movement on the outer surface of said body, said sleeve having a restricted portion at the valve attachment end whereby in response to the opening of said valves said enlarged head is forced above said pronged, tubular members and said sleeve locks said pronged, tubular members below said head.

CUSTER A. WOFFORD.

REFERENCES CITED

The following references are of record in the file of this patent:

UNITED STATES PATENTS

| Number | Name | Date |
|---|---|---|
| 2,103,475 | Lindsly | Dec. 28, 1937 |
| 2,147,983 | Lindsly | Feb. 21, 1939 |
| 2,161,557 | Clark | June 6, 1939 |
| 2,265,098 | Bettis | Dec. 2, 1941 |
| 2,342,367 | Pryor | Feb. 22, 1944 |
| 2,374,557 | Millikan | Apr. 24, 1945 |
| 2,396,809 | Addison | Mar. 19, 1946 |